3,194,826
PROCESS OF PRODUCING 2-AMINO ALKANOL ESTERS OF SULFURIC ACID
Albert Goldstein, New Shrewsbury, and Frank A. Nowak, Jr., Ridgefield Park, N.J., assignors to Chemirad Corporation, East Brunswick, N.J., a company of Delaware
No Drawing. Filed Dec. 29, 1961, Ser. No. 163,047
9 Claims. (Cl. 260—458)

The present invention relates to an improved process of producing 2-amino alkyl sulfuric acid esters.

2-amino ethyl sulfuric acid ester has been produced heretofore by mixing 50% aqueous solutions of mono-ethanolamine and sulfuric acid and heating the mixture to a maximum temperature of 250° C., whereby all the distillable water including water of reaction is removed from the reaction mixture. On cooling, 2-amino ethyl sulfuric acid is obtained in a rather low yield of 71% of the theoretical yield. However, before solidification, the product must be removed from the reaction vessel to permit later grinding since there is insufficient water remaining in the mixture to permit controlled rather than mass crystallization.

The same mixture as given above is dehydrated in a vacuum with the pot temperature rising to 155–160° C. before crystallization occurs, the same conditions prevailing as in the above examples. After cooling, the reaction mass must be softened by the addition of ethanol and ground with the admixture of additional ethanol, filtered, and dried;
Yield: 90–95% of the theoretical yield.

According to another known process, a mixture of 1.0 mole of 99% mono-ethanolamine and 1.1 mole of 88.3% sulfuric acid is combined with strong cooling, the amine being added to the acid. The mixture is then heated at 130° C. for one hour. After cooling, absolute ethanol is added to the reaction mixture to soften the same and to give a filterable material.

According to an alternative method a mixture of mono-ethanolamine and sulfuric acid of the same concentration as given above is allowed to stand at room temperature for 72 hours. The reaction mixture is worked up as described above with the addition of expensive absolute alcohol which would have to be recovered in a commercial process.

Still another process consists in dehydrating a mixture of mono-ethanolamine and concentrated sulfuric acid of at least 77% in the presence of, preferably, comminuted solid 2-amino ethyl sulfuric acid ester, whereby the solid phase is present at all times during dehydration. This is accomplished by a programmed temperature increase coupled with a reduction in the pressure on the system. Such controlled operation is difficult, requiring skilled operators and/or expensive instrumentation.

In another known process of preparing mono-amino ethyl sulfuric acid ester, mono-ethanolamine, and sulfuric acid are combined in o-dichloro benzene. The mixture is stirred at 60° C. for 2 hours and is then heated to 80–100° C. under vacuum to remove the water split off during reaction. The o-dichloro benzene is then distilled off, also under vacuum. The crystalline 2-amino ethyl sulfuric acid ester remains in the reaction vessel.

All these known processes have a number of disadvantages: They yield a molten reaction product which has to be removed from the reactor at just the proper time in order to obtain maixmum yields and still not permit solidification in the reactor; they require the addition of alcohol, to give a workable and filterable slurry; they have to be operated under closely controlled conditions so as to maintain a solid phase of 2-amino ethyl sulfuric acid ester in contact with the liquid reaction mixture during a programmed heating cycle; o-dichloro benzene which is used in the last mentioned known process is a rather expensive solvent and its complete removal from the reaction mixture or the reaction product is extremely difficult.

It is one object of the present invention to overcome these disadvantages and to provide a simple and effective process of producing 2-amino ethyl sulfuric acid and the like esters in a good yield and by proceeding in a manner which could readily be adapted to normal chemical processing equipment and to the skills of production operators, whereby the need for unusual equipment or instrumentation would be eliminated.

Other objects of the present invention and advantageous features thereof will become apparent as the description proceeds.

In principle the procedure according to the present invention is as follows:

With the temperature controlled so as to avoid either degradation or solidification of the products or reactants, 70–75° C. being preferred, commercial mono-ethanolamine with or without water dilution is pumped into sulfuric acid either diluted or concentrated—95–100% as in the preferred method—the two reactants being used in molar equivalent amounts. The resulting slurry is heated to 120–200° C. preferably to 130–165° C. at atmospheric pressure for at least one hour. Shorter heating periods may be used but optimum results are obtained by use of a heat treatment of at least one hour's duration. Vacuum is then applied and water is removed from the reaction mixture, the temperature being maintained at 110° C. or higher until crystallization occurs. Crystallization is rather rapid and the heat of crystallization is such that the externally applied heat may be substantially reduced.

It has been found that inferior results are obtained if a portion of the water is not removed by distillation during the reaction.

Vacuum is maintained on the system until the mass becomes difficult to stir, a state which may conveniently be determined by the reading on a motor load meter installed with the stirrer motor. At this point, the reaction vessel is restored to atmospheric pressure and sufficient water is added to the mixture to maintain fluidity. The reaction mixture is then cooled to room temperature, additional water being added as required. Although it is not critical, the minimum amount of water is used in this operation in order to simplify later steps.

The cooled mixture is filtered or centrifuged and the reaction product is washed with water. In a procedure such as outlined above, a product of about 95% purity is obtained in about 75–80% yield.

The filtrate from the above procedure is combined with the salt formed from mono-ethanolamine and sulfuric acid in another batch and subjected to the same treatment.

This cyclic process has been carried through 17 cycles without any indication of product degradation, impurity build-up, etc. Under these conditions, a product of greater than 95% purity is obtained in yields exceeding 95% of the theoretical yield.

This procedure according to the present invention allows production of 2-amino alkyl sulfuric acid esters in a controlled reproducible manner, unlike the techniques previously reported. The process of the invention is characterized by driving the reaction to near completion, this being achieved by application of heat and vacuum with sufficient water being retained in the reaction mixture to permit controlled crystallization. Accordingly, the reaction mixture is heated under vacuum until crystallization sets in while less than substantially all of the water is being removed from the reaction mixture. The reaction mixture is then rendered amenable to simple production techniques, such as centrifugation, by the addition of water during cooling. The amount of water to be added must be sufficient to maintain the mobility of the mixture and is dependent upon the solubility properties of the reactants, reaction products and upon the capacity of the equipment being used.

The observance of these precautions results, in a procedure for the preparation of 2-amino alkyl sulfuric acid esters which may readily be adapted to commercial production without the requirement for expensive instrumentation, skilled labor, expensive solvents, and without incurring the risk of damaging the equipment through premature solidification of the reaction mixture.

Sulfuric acid esters of substituted ethanolamines, such as 2-methyl ethanolamine, 2,2-dimethyl ethanolamine, N-methyl ethanolamine, and others may also be produced by this procedure.

There is no necessity that the alkanolamine be added to the acid since the neutralization may be run by addition of acid to amine or by simultaneous addition of the reactants. The novelty of the process lies not in the neutralization step but in the subsequent treatment of the amine salt.

The following examples serve to illustrate the present invention without, however, limiting the same thereto.

EXAMPLE 1

With the reaction temperature maintained at 65–70° C., 244 g. of mono-ethanolamine are added to 400 g. of 98% sulfuric acid. The resulting slurry of amine salt is heated to 135° C. and maintained at said temperature for one hour. The pressure on the system is then reduced to 50 mm. Hg while stirring and heating are continued, 30 g. of water being removed. Heat and vacuum are discontinued when crystallization occurs, this being accompanied by a sharp rise in the temperature of the reaction mixture. Stirring is maintained, about 50 cc. of water being added, as required to maintain a sufficient degree of mobility in the slurry during the process of cooling to a temperature near room temperature.

The product slurry is filtered by suction and washed with cold water, then dried at 90–100° C. Yield: 428 g. (76% of the theoretical yield).

EXAMPLE 2

A reaction mixture is prepared as in Example 1, except that the filtrate plus washes (about 200 g.) from Example 1 are added to the amine salt slurry prior to heating to 135° C. The remainder of the operation is as described in Example 1.

Average yield for a series of batches of this size is 506–535 g. (90–95% of the theoretical yield.)

The product is a white, crystalline, free-flowing powder having a purity of 95% or over.

The following Table I illustrates the results achieved on recycling the filtrates and washes from each preceding operation.

*Table I*

| Number of run | 98% ethanolamine (lbs.) | 93.2% H₂SO₄ (lbs.) | Yield of 2-amino ethyl sulfuric acid ester (lbs.) | Yield in percent of the theory |
|---|---|---|---|---|
| A-15 | 374 | 635 | 673 | 96.2 |
| A-16 | 372 | 631 | 788 | 96.1 |
| A-17 | 370 | 630 | 847.5 | 97.5 |
| A-18 | 370 | 630 | 873.5 | 95.7 |
| A-19 | 371 | 631 | 875 | 95.6 |
| A-20 | 332 | 563 | 812 | 96.5 |
| A-21 | 370 | 630 | 779.5 | 93.0 |
| A-22 | 370 | 630 | 913 | 92.5 |
| A-23 | 370 | 630 | 827 | 92.9 |
| A-24 | 284 | 475 | 716.5 | 94.5 |

The following examples show that the process according to the present invention is applicable to other alkanolamines than mono-ethanolamine.

EXAMPLE 3

300 g. of mono-isopropanolamine were added to 400 g. of 98% sulfuric acid with the temperature being maintained at about 70° C. The resulting slurry was heated to 165° C. and water removed by vacuum distillation until crystallization occurred. 56% of the theoretical amount of water was removed in this step. Upon crystallization, the mixture was cooled with small amounts of water (about 100 cc.) being added as required to maintain mobility of the crystalline mass of ethyl sulfuric acid ester. The product was filtered, washed with water, and dried. Yield: 37.5% of the theoretical yield; purity: 100%.

EXAMPLE 4

A series of three runs were made using isopropanolamine and sulfuric acid as described in Example 3. The combined filtrates from Run A were added to Run B prior to heating to 165° C. and the filtrates from Run B were added to Run C in the same manner. The results of these series were as follows:

*Table II*

| Run: | Yield (percent of the theory) |
|---|---|
| A | 20 |
| B | 43 |
| C | 45 |

A large scale pilot plant repetition of this laboratory experiment gave a yield of 50% in the first run and an increased yield on recycling.

EXAMPLE 5

356 g. of 2,2-dimethyl-2-aminoethanol were added to 400 g. of 98% sulfuric acid as described in Example 3 and heat-treated and vacuum distilled at 160° C. Upon crystallization, the flask was cooled with water (about 125 cc.) being added as required to maintain mobility. Filtration, washing, and drying gave 2,2-dimethyl-2-amino ethyl sulfuric acid ester in a yield of 52.8% of the theoretical yield and with a purity of 99.3%.

Recycling of the filtrate and wash waters will cause an increase in yield and almost quantitative recovery of the reaction product.

EXAMPLE 6

300 g. of N-methyl-2-aminoethanol was added to 400 g. of 98% sulfuric acid as in Example 3 and heat-treated and vacuum distilled at 150° C. until no more water distills. Thereby about 76% of the theoretical amount of water have been removed.

Cooling the solution below 80° C., thereby adding an amount of water sufficient to permit stirring, resulted in the crystallization of N-methyl-2-amino ethyl sulfuric acid ester.

We claim:

1. The process of producing a 2-amino lower alkanol sulfuric acid ester which comprises the steps of
    reacting substantially equimolecular amounts of a 2-amino lower alkanol and sulfuric acid at a temperature between about 65° C. and about 75° C., thereby forming the amino lower alkanol sulfuric acid addition salt,
    heating the resulting mixture to a temperature between about 120° C. and about 200° C.,
    removing less than substantially all of the water from the reaction mixture by heating it under vacuum until crystallization sets in,
    cooling the fluid reaction mixture at atmospheric pressure and separating the crystalline 2-amino lower alkanol sulfuric acid ester from the reaction mixture.

2. The process of claim 1 in which there is reacted 2-amino ethanol and sulfuric acid to give the crystalline 2-amino ethyl sulfuric acid ester.

3. The process of claim 1 in which there is reacted 1-amino propanol-(2) and sulfuric acid to give the crystalline 2-amino-1-methyl ethyl sulfuric acid ester.

4. The process of claim 1 in which there is reacted N-methyl-2-amino ethanol and sulfuric acid to give the crystalline N-methyl-2-amino ethyl sulfuric acid ester.

5. The process of claim 1 in which, after crystallization of the product has set in, there is admixed an additional amount of water.

6. The process of producing a 2-amino lower alkanol sulfuric acid ester which comprises the steps of
reacting substantially equimolecular amounts of a 2-amino lower alkanol and sulfuric acid at a temperature between about 65° C. and about 75° C., thereby forming the amino lower alkanol sulfuric acid addition salt,
heating the resulting mixture to a temperature between about 120° C. and about 200° C.,
removing not more than about 76% of water from the reaction mixture by heating it under vacuum until crystallization sets in,
cooling the fluid reaction mixture at atmospheric pressure and separating the crystalline 2-amino lower alkanol sulfuric acid ester from the reaction mixture.

7. The process of producing a 2-amino lower alkanol sulfuric acid ester which comprises the steps of
reacting substantially equimolecular amounts of a 2-amino lower alkanol and sulfuric acid at a temperature between about 65° C. and about 75° C., thereby forming the amino lower alkanol sulfuric acid addition salt,
heating the resulting mixture to a temperature between about 120° C. and about 200° C.,
removing less than substantially all of the water from the reaction mixture by heating it under vacuum at a temperature of at least 110° C. until crystallization sets in,
cooling the fluid reaction mixture at atmospheric pressure and separating the crystalline 2-amino lower alkanol sulfuric acid ester from the reaction mixture.

8. The cyclic process of producing a 2-amino lower alkanol sulfuric acid ester which comprises the steps of
reacting substantially equimolecular amounts of a 2-amino lower alkanol and sulfuric acid at a temperature between about 65° C. and about 75° C., thereby forming the amino lower alkanol sulfuric acid addition salt,
heating the resulting mixture to a temperature between about 120° C. and about 200° C.,
removing less than substantially all of the water from the reaction mixture by heating it under vacuum until crystallization sets in,
cooling the fluid reaction mixture at atmospheric pressure and separating the crystalline 2-amino lower alkanol sulfuric acid ester from the reaction mixture, washing the crystalline product and adding the resulting wash water to the reaction mixture containing the amino lower alkanol sulfuric acid addition salt.

9. The process of producing a 2-amino lower alkanol and ester which comprises the steps of
heating a slurry of an amino lower alkanol sulfuric acid addition salt at a temperature in the range of about 120° C. and about 200° C.,
removing less than substantially all of the water from the reaction mixture by heating it under vacuum until crystallization sets in,
cooling the fluid reaction mixture at atmospheric pressure and separating the crystalline 2-amino lower alkanol sulfuric acid ester from the reaction mixture.

References Cited by the Examiner

UNITED STATES PATENTS

| | | | |
|---|---|---|---|
| 2,264,759 | 12/41 | Jones | 260—458 |
| 3,037,042 | 5/62 | Laemmle | 260—458 |

OTHER REFERENCES

Suter: Organic Chemistry of Sulfur, page 38 (1944).

CHARLES B. PARKER, *Primary Examiner.*